(12) United States Patent
Oliver et al.

(10) Patent No.: US 6,902,045 B2
(45) Date of Patent: Jun. 7, 2005

(54) APPARATUS, SYSTEM AND METHOD FOR A VEHICLE SUSPENSION SYSTEM

(75) Inventors: Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/407,070

(22) Filed: Apr. 3, 2003

(65) Prior Publication Data

US 2004/0195745 A1 Oct. 7, 2004

(51) Int. Cl.[7] ................................................. F16F 9/00
(52) U.S. Cl. ............... 188/321.11; 267/226; 267/64.11; 267/34; 267/175
(58) Field of Search ................................. 267/221, 222, 267/224, 225, 226, 64.11, 34, 175, 177, 178; 280/124.145, 124.154; 188/321.11, 322.19

(56) References Cited

U.S. PATENT DOCUMENTS

| | | | | |
|---|---|---|---|---|
| 3,603,575 A | * | 9/1971 | Arlasky et al. | 267/34 |
| 5,044,614 A | * | 9/1991 | Rau | 267/221 |
| 5,116,016 A | * | 5/1992 | Nagata | 248/578 |
| 5,553,836 A | * | 9/1996 | Ericson | 267/286 |
| 5,722,645 A | * | 3/1998 | Reitter | 267/177 |
| 5,803,443 A | * | 9/1998 | Chang | 267/221 |
| 6,142,268 A | * | 11/2000 | Kuo-An | 188/274 |
| 6,181,997 B1 | | 1/2001 | Badenoch et al. | |
| 6,219,602 B1 | | 4/2001 | Badenoch et al. | |
| 6,370,458 B1 | | 4/2002 | Shal et al. | |
| 6,397,134 B1 | | 5/2002 | Shal et al. | |
| 6,547,224 B2 | | 4/2003 | Jensen et al. | |
| 6,592,112 B2 | | 7/2003 | Bishop et al. | |
| 6,633,803 B1 | | 10/2003 | Shal et al. | |

* cited by examiner

Primary Examiner—Robert A. Siconolfi
Assistant Examiner—Devon Kramer
(74) Attorney, Agent, or Firm—Michael D. Smith

(57) ABSTRACT

A vehicle suspension system comprising a damper having a lower mount end and an upper mount end and a spring having a lower end and an upper end positioned around the damper. The spring and the damper have a common central axis. An adjustment assembly is operably attached at the lower mount end of the damper and the lower end of the spring is operably attached to and supported by the adjustment assembly thereby allowing the position of the lower end of the spring to continuously vary along the central axis of the damper. The method comprising supporting a lower end of a spring positioned around a damper and moving the end of the spring for adjusting vehicle ride height.

18 Claims, 5 Drawing Sheets

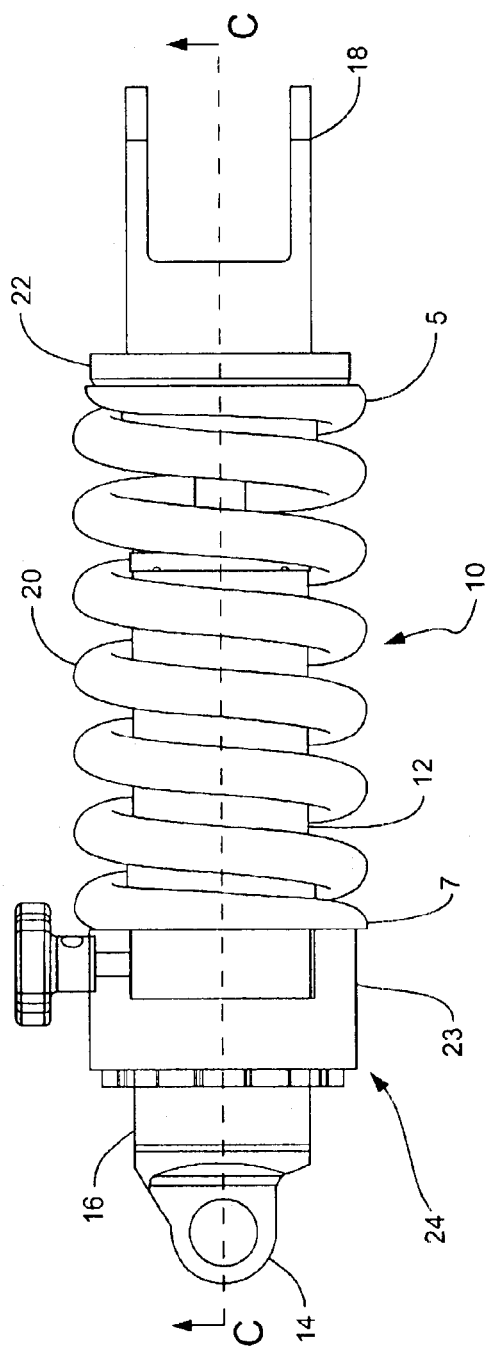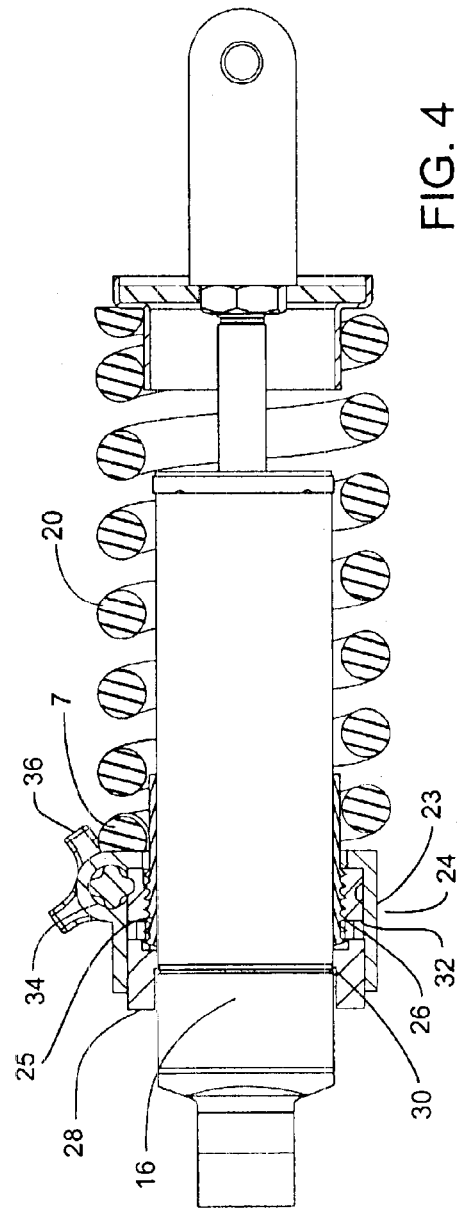

APPARATUS, SYSTEM AND METHOD FOR A VEHICLE SUSPENSION SYSTEM

FIELD OF THE INVENTION

The present invention pertains, generally, to a motor vehicle suspension system and, more particularly, to a suspension damper having a spring seat position adjuster.

BACKGROUND OF THE INVENTION

The suspension systems on many vehicles adjust the spring force applied to the suspension to allow the vehicle to maintain a desired ride height or attitude under changing load conditions while maintaining a softer (lower rate) spring for comfort. However, current designs allow only step adjustment to a spring seat or, alternatively, use more complex and expensive hydraulically adjustable spring seat. Other suspension systems, used in racecars, have externally threaded bodies to adjust the spring seat of the suspension damper. These systems are also expensive and are not readily available for regular types of vehicles. Adjustment of these systems also requires special tools or hydraulic pumps.

Accordingly, it would be desirable to have a system and method of vehicle suspension adjustment that overcomes these and other disadvantages.

SUMMARY OF THE INVENTION

One aspect of the invention is a vehicle suspension system comprising a damper having a lower mount end and an upper mount end, a spring having a lower end and an upper end positioned around the damper. The spring and the damper have a common central axis. An adjustment assembly is operably attached at the lower mount end of the damper and the lower end of the spring is operably attached to and supported by the adjustment assembly thereby allowing the position of the lower end of the spring to continuously vary along the central axis of the damper.

Another aspect of the invention provides a method for adjustment of a suspension system by supporting a lower end of a spring positioned around a damper and moving the end of the spring for adjusting vehicle ride height.

Another aspect of the invention provides, a system for adjustment of a suspension including means for supporting a lower end of a spring positioned around a damper and means for moving the end of the spring for adjusting vehicle ride height.

These and other features and advantages of the invention will become further apparent, to those skilled in the art, from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is a side view of one embodiment of the suspension system made in accordance with the invention;

FIG. 4 is a cross sectional view of the suspension system of FIG. 1 taken along section line C—C of FIG. 1;

DETAILED DESCRIPTION OF THE INVENTION

Figure 2:
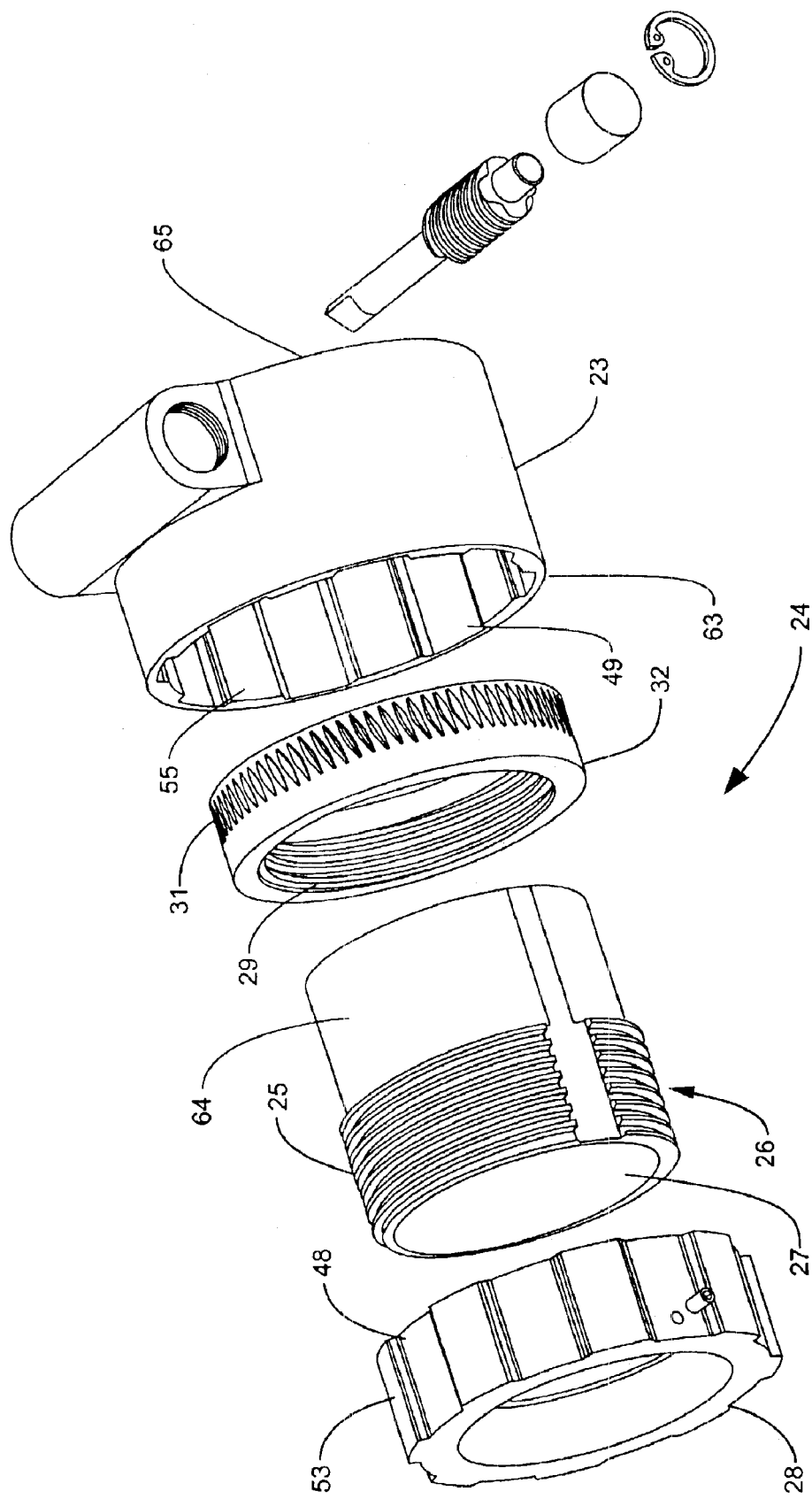
FIG. 2 is an exploded view of an adjustment assembly within the suspension system illustrated in FIG. 1.

FIG. 1 illustrates one embodiment of the suspension system and is generally shown at numeral 10. The system includes a linear suspension damper (shock absorber or strut) 12 with a lower mount 14 connected to a first end of the damper body 16 and a top mount 18 connected to a second end of damper body 16. A coil spring 20, with upper end 5 and lower end 7, is positioned around damper body 16 and shares a common central axis with suspension damper 12. Upper end 5 of coil spring 20 is supported at top mount 18 by an annular flange 22 suitably secured to top mount 18. An adjustment assembly 24 supports lower end 7 of coil spring 20, at lower mount 14 of suspension damper 12. Adjustment assembly 24 acts as a spring seat, bearing the weight of the vehicle supported by suspension system 10. Further detail of the adjustment housing 24 and its components are illustrated in FIGS. 2 and 3.

FIG. 2 illustrates an exploded view of adjustment assembly 24. Adjustment assembly 24 includes a housing 23, a sleeve 26, and a ring gear 32. Housing 23 has a first end 63 and a second end 65. Sleeve 26 is cylindrical and has a threaded end 25 and an unthreaded end 64 on its outside surface and an unthreaded inside surface 27. The ring gear 32 has a threaded inner surface 29 and a worm threaded outer surface 31. The threaded inner surface 29 of ring gear 32 mates with threaded end 25 of sleeve 26. Sleeve 26 and ring gear 32 fit inside first end 63 of housing 23. Sleeve support 28 supports sleeve 26 inside first end 63 of housing 23. The inside surface of housing 23 at first end 63 has longitudinal grooves 49 and ridges 55. Sleeve support 28 has external longitudinal grooves 48 and ridges 53, which mate with the ridges 55 and longitudinal grooves 49, respectively, on the inside of housing 23. The mating of these grooves and ridges prevents rotation of housing 23 about damper 12.

Figure 3:
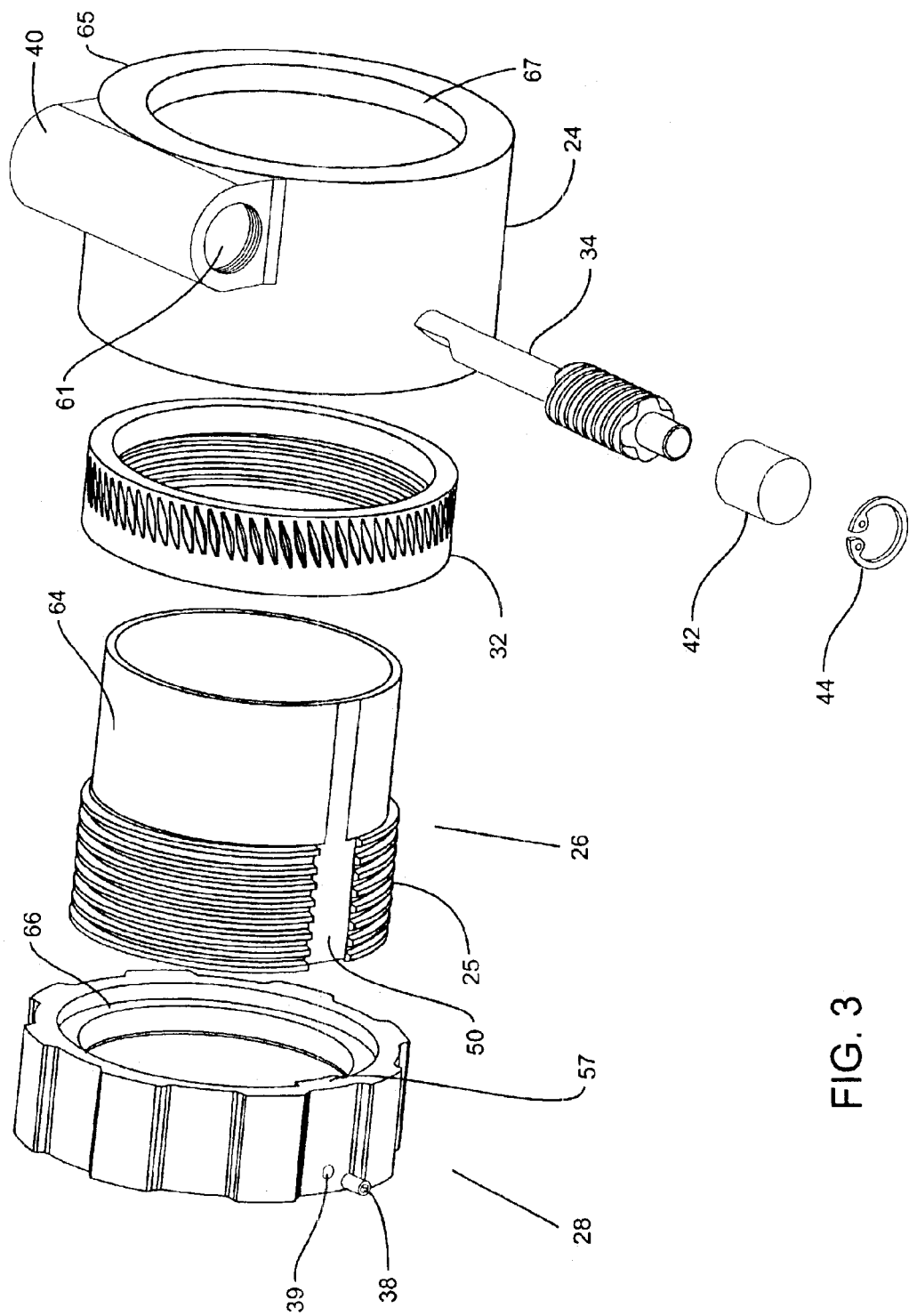
FIG. 3 is another exploded view of an adjustment assembly within the suspension system illustrated in FIG. 1.

FIG. 3 is an exploded view showing the adjustment assembly 24 of FIG. 2 from a different angle of perspective. A groove 50 is located on the outside surface of sleeve 26. Groove 50 aligns with tab 57 machined in sleeve support 28. Tab 57 prevents relative rotation of sleeve support 28 with sleeve 26. Sleeve support 28 has a shelf 66 that supports sleeve 26 and retains sleeve 26 in housing 23. The inside surface of housing 23 at second end 65 is smooth allowing clearance for ring gear 32 to engage an adjuster rod 34 and to rotate inside housing 23. Housing 23 has a rim 67 at second end 65 that retains ring gear 32 inside housing 23 but allows sleeve 26 to extend out of housing 23. Setscrew 38 is inserted in threaded hole 39 in sleeve support 28. A port 40 is located on the outside of housing 23. Adjuster rod 34 is inserted into an opening 61 in port 40 on housing 23. Bearing 42 and retaining ring 44 are inserted in the port 40 to retain adjuster rod 34 in port 40.

FIG. 4 illustrates a cross sectional view of suspension system 10 taken along section line C—C of FIG. 1. Adjustment assembly 24 is positioned at the lower mount 14 end of damper 16 and supports lower end 7 of coil spring 20. Sleeve 26 is positioned around damper 16. Ring gear 32 is mated to sleeve 26. Housing 23 encloses threaded portion 25 of sleeve 26 and ring gear 32. Sleeve support 28 supports and retains sleeve 26 inside housing 23. Sleeve support 28 is supported on damper body 16 by retaining ring 30 that is engaged in a groove machined in the circumference of damper body 16. Ring gear 32, when rotated, will travel along the length of the sleeve 26. A handle 36, such as a knob, is provided for turning adjuster rod 34, which in turn rotates the ring gear 32. When ring gear 32 rotates, it travels along the length of sleeve 26, consequently displacing along the length of the damper body 16. Housing 23 bears against and moves along with ring gear 32. The position of the end of coil spring 20, which is seated against adjustment assembly 24, changes with respect to the lower end of the damper body 16 as ring gear 32 moves.

Figure 5:
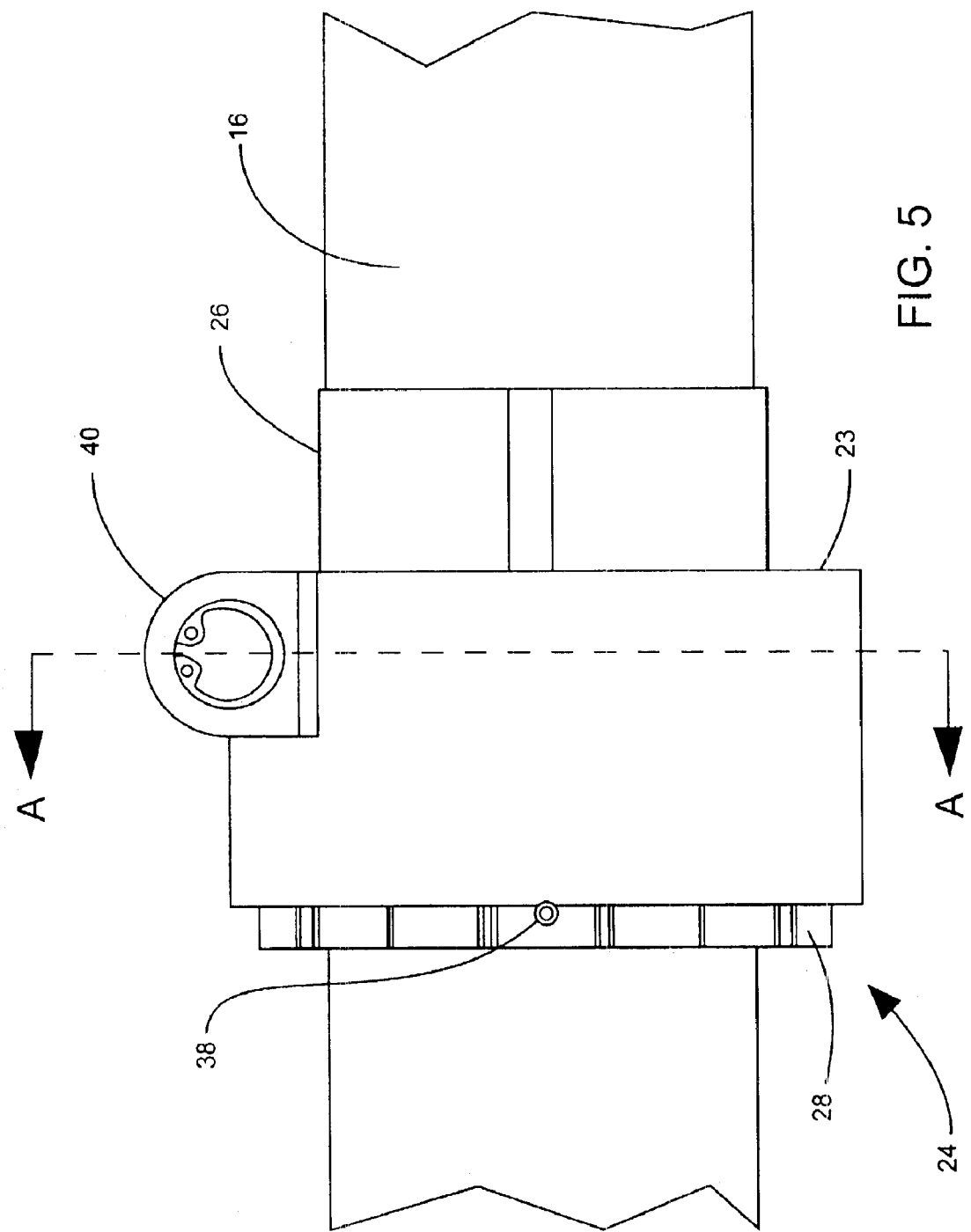
FIG. 5 is a side view of one embodiment of the adjustment assembly of the suspension system of FIG. 1.

FIG. 5 illustrates a side view of one embodiment of adjustment assembly 24. Sleeve 26 extends out of housing 23. Setscrew 38 extends through sleeve support 28 and engages damper 16. Setscrew 38 prevents rotation of sleeve support 28 relative to damper 16. Cylindrical port 40, for insertion of adjuster rod 34, is provided in housing 23. Port 40 is oriented tangentially to housing 23.

Figure 6:
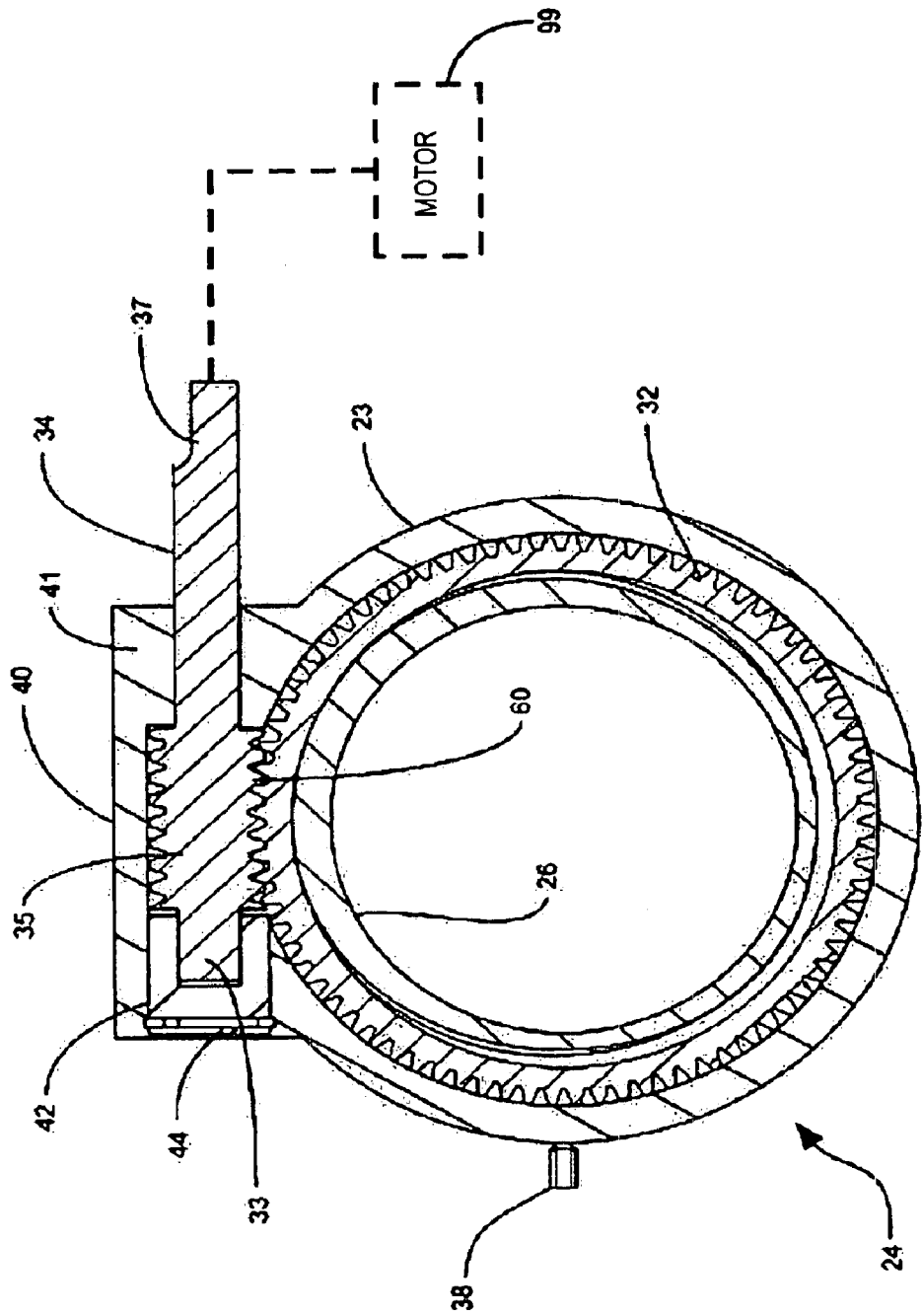
FIG. 6 is a cross sectional view of the adjustment assembly taken along section line A—A of FIG. 5.

FIG. 6 illustrates a cross sectional view of the adjustment assembly 24 taken along section line A—A of FIG. 5. Sleeve 26 is mated to the ring gear 32 within housing 23. Sleeve 26, ring gear 32, and housing 23 are each arranged concentrically. Port 40 is shown positioned on adjustment housing 24. Port 40 covers an opening 60 in housing 23. Port 40 is shown as integral to housing 23. In other embodiments of the invention, port 40 may be secured to housing 23 by a weld, mounting bolt, or other suitable method of attachment.

Adjuster rod 34 includes threaded portion 35, first unthreaded end 37, and second unthreaded end 33. First unthreaded end 37 and second unthreaded end 33 of adjuster rod 34 have a smaller diameter than threaded portion 35. Port 40 has an inside diameter sufficient to allow adjuster rod 34 to be inserted into port 40. Port 40 inside diameter is reduced at one end 41 to allow first unthreaded end 37 of adjuster rod 34 to be inserted through end 41 of port 40 and extend outside port 40. First unthreaded end 37 of adjuster rod 34 comprises half the length of adjuster rod 34 while second unthreaded end 33 comprises one eighth of the length of adjuster rod 34. Those skilled in the art will recognize that the dimensions of adjuster rod 34 will be optimized for the specific suspension system on which it is employed. Other embodiments of the invention may employ other adjuster rod configurations as a means for adjusting the suspension system. Handle 36 shown in FIG. 3 is attached to first unthreaded end 37 that extends outside port 40 at end 41. Bearing 42 is placed over second unthreaded end 33 of adjuster rod 34 inside port 40. Retaining ring 44 retains bearing 42 and adjuster rod 34 inside port 40. Threaded portion 35, of adjuster rod 34, mates with worm threaded outer surface 31 of ring gear 32 through opening 60 in housing 23.

In the exemplary form described herein, adjuster rod 34 is mounted tangentially to housing 23. In other embodiments it may be preferable to mount adjuster rod 34 so that its central axis intersects the adjustment housing at some other angle. An embodiment of this nature would require threaded portion 35 of adjuster rod 34 to extend through and include the previously described second unthreaded end 33.

Also, in the exemplary form described herein, adjuster rod 34 is mounted inside closed port 40. In other forms of the invention different methods of securing adjuster rod 34 to housing 23 may be used. Those methods include clamps, tabs, mounting bolts, and the like.

Further, in the exemplary form described herein sleeve 26 is installed around damper 16. In another form of the invention, sleeve 26 can be removed, and replaced with a threaded portion on the outside surface of damper 16.

Additionally, in the exemplary form described herein, setscrew 38 is inserted in threaded hole 39 in sleeve support 28 and contacts damper 16. Setscrew 38 prevents rotation of sleeve support 28 relative to damper 16. Tab 57 on sleeve support 28 aligns with groove 50 on sleeve 26. Tab 57 prevents rotation of sleeve 26 relative to sleeve support 28. In another form of the invention, setscrew 38 could be inserted in threaded hole 39, pass through a hole in sleeve 26 and engage damper 16, thereby preventing sleeve 26 and sleeve support 28 from rotating about damper 16.

In operation, the vehicle operator can adjust the location at which spring force is applied with respect to other parts of the vehicle suspension. Typically this would be used to compensate for the weight being carried by the vehicle. In the case of a relatively light vehicle load coil spring 20 would be relatively long. To maintain the desired ride height, adjustment assembly 24 would be adjusted to a position relatively close to lower mount 14, thereby lowering the vehicle. Inversely, coil spring 20 would be relatively short under a heavy vehicle load. Adjustment assembly 24 would be adjusted to a position farther from lower mount 14, thereby raising the vehicle the adjustment system provides for continuous adjustment of the suspension system allowing the vehicle operator to set a desired ride height within the limits of the adjustment assembly. Continuous adjustment is achieved by allowing housing 23 supporting the lower end of coil spring 20 to travel along a threaded sleeve.

To change vehicle ride height, the vehicle operator turns handle 36, thereby rotating adjuster rod 34. The rotation of adjuster rod 34 is transferred to ring gear 32 with the engagement of threaded portion 35 of adjuster rod 34 with worm threaded outer surface 31 of ring gear 32. The rotation of ring gear 32 results in linear travel of ring gear 32 along threaded sleeve 26. The linear travel of ring gear 32 moves housing 23 that bears against and is supported by ring gear 32. The movement of housing 23 changes the position of the end of coil spring 20 in relation to lower mount 14. The ability to provide continuous adjustment, by varying the position of threaded sleeve 26, allows the vehicle to maintain the desired ride height under any load condition.

Another embodiment of the suspension system 10, eliminates threaded sleeve 26 and replaces it with threads machined into damper body 16. Threaded inner surface 29 of ring gear 32 mates with these threads and travels along them inducing the resultant movement of housing 23. Sleeve support 28 will not require shelf 66. Sleeve support 28 will be employed to prevent rotation of housing 23 about damper 12. The longitudinal grooves 49 and ridges 55 of housing 23 and the corresponding external longitudinal grooves 48 and ridges 53 of sleeve support 28 described herein will prevent rotation of housing 23 about damper 12.

The exemplary form of suspension system 10 described herein is intended for use on motorcycles or other small motorized vehicles, where the suspension system is easily accessible by the vehicle operator. However, those skilled in the art will recognize that the simple construction of suspension system 10 may be adapted to other types of vehicles. Dimensions of the components of adjustment assembly 24 will vary according to the vehicle to which adjustment assembly 24 is adapted. The necessary variation of spring length for larger vehicles will require greater travel of ring gear 32. A longer threaded end 25 of threaded sleeve 26 is required for the additional travel. Other differences such as, but not limited to vehicle weight, damper diameter, and spring size may require dimensional variations in the adjustment assembly 24 of this invention. In other forms of the invention, an electric motor (motor 99 in FIG. 6) or other rotary actuator could rotate adjuster rod 34, preserving the simple design, while providing automatic control of vehicle ride height. Furthermore, sensors may be provided which determine vehicle load and send control signals to the electric motor or other rotary actuator thereby maintaining desired ride height. Motor vehicles, such as cars, trucks and other large vehicles may require these alternative forms of the invention since their suspension systems are not usually accessible to the vehicle operator.

The construction and use of the invention and parts thereof previously described and shown in the accompanying drawings is believed to be understandable to those of ordinary skill in the art based on the description and drawings. While the embodiment of the invention disclosed herein is presently considered to be preferred, those skilled in the art will further appreciate that various changes and modifications can be made without departing from the spirit and scope of the invention. The scope of the invention is indicated in the appended claims, and all changes that come within the meaning and range of equivalents are intended to be embraced therein.

We claim:

1. A vehicle suspension system comprising:
   a damper having a lower mount end and an upper mount end;
   a spring having a lower end and an upper end, the spring positioned around the damper, the spring and the damper having a common central axis;
   an adjustment assembly operably attached at the lower mount end of the damper and supporting the lower end of the spring,
   the adjustment assembly comprising
   a housing;
   a ring gear positioned within and supporting the housing, the ring gear having a worm threaded outer surface and a threaded inner surface;
   a sleeve including a threaded outer portion engaged with the threaded inner surface of the ring gear;
   an adjuster rod including a threaded portion and a non-threaded portion, the threaded portion for engaging with the worm threaded outer surface of the ring gear, wherein rotation of the adjuster rod laterally moves the ring gear with respect to the sleeve, within the housing;
   a sleeve support positioned at one end of the sleeve to hold the sleeve within the housing; and
   a retaining ring positioned within a groove in the damper to anchor the sleeve support to the damper,
   wherein movement of the adjustment assembly in a first direction lengthens the spring and movement of the adjustment assembly in a second direction shortens the spring.

2. The vehicle suspension system of claim 1 wherein:
   the housing includes an inside surface having a plurality of longitudinally extending grooves and a plurality of longitudinally extending ridges; and
   the sleeve support includes an outside surface having a plurality of longitudinally extending grooves and a plurality of longitudinally extending ridges that mate with the longitudinally extending ridges and the longitudinally extending grooves on the inside surface of the housing.

3. The vehicle suspension system of claim 1 wherein the sleeve support includes a hole; and further comprising a screw disposed in the hole to engage the damper and prevent rotation of the sleeve support about the damper.

4. The vehicle suspension system of claim 1 wherein:
   the sleeve includes a groove on its outer surface; and
   the sleeve support includes a tab that aligns with the groove in the sleeve preventing relative rotation of the sleeve support and the sleeve.

5. The vehicle suspension system of claim 1 further comprising:
   a port located in the housing, the adjuster rod inserted into the port and positioned tangentially to the ring gear;
   a bearing for retaining the adjuster rod in the port; and a retaining ring for retaining the bearing in the port.

6. The vehicle suspension system of claim 1 further comprising:
   a handle connected to an end of the non-threaded portion of the adjuster rod for rotating the adjuster rod.

7. The vehicle suspension system of claim 1 further comprising:
   a motor operatively coupled to an end of the non-threaded portion of the adjuster rod for rotating the adjuster rod.

8. The suspension system of claim 1 further comprising:
   a hole defined in the sleeve support; and
   a setscrew disposed within the hole and contacting the damper.

9. The suspension system of claim 1 further comprising:
   a tab formed on the sleeve support; and
   the sleeve support having a groove; whereby the tab contacts the groove.

10. The suspension system of claim 1 further comprising:
    the sleeve support having a first hole;
    the sleeve having a second hole in alignment with the first hole; and
    a setscrew disposed within the first hole and the second hole and contacting the damper.

11. A vehicle suspension system comprising:
    a damper having a lower mount end and an upper mount end;
    a spring having a lower end and an upper end, the spring positioned around the damper, the spring and the damper having a common central axis;
    an adjustment assembly operably attached at the lower mount end of the damper and supporting the lower end of the spring,
    the adjustment assembly comprising
    a housing supporting the lower end of the spring;
    a ring gear positioned within the housing having a worm threaded outer surface and a threaded inner surface;
    a threaded portion at one end of the damper engaged with the threaded inner surface of the ring gear;
    a sleeve support positioned at one end of the housing to hold the ring gear within the housing;
    an adjuster rod including a threaded portion and a non-threaded portion, the threaded portion for engaging with the worm threaded outer surface of the ring gear, wherein rotation of the adjuster rod laterally moves the ring gear with respect to the damper, within the housing; and
    a retaining ring positioned within a groove in the damper to anchor the sleeve support to the damper.

12. The vehicle suspension system of claim 11 wherein:
    the housing includes an inside surface having a plurality of longitudinally extending grooves and a plurality of longitudinally extending ridges; and
    the sleeve support including an outside surface having a plurality of longitudinally extending grooves and a plurality of longitudinally extending ridges that mate with the longitudinally extending ridges and the longitudinally extending grooves on the inside surface of the housing.

13. The vehicle suspension system according to claim 11 further comprising:
    a port located in the housing, the adjuster rod inserted into the port and positioned tangentially to the ring gear;
    a bearing for retaining an adjuster rod in the port; and a retaining ring for retaining the bearing in the port.

14. The vehicle suspension system according claim 11 further comprising:
    a handle connected to an end of the non-threaded portion of the adjuster rod for rotating the adjuster rod.

15. The vehicle suspension system according to claim 11 further comprising:
    a motor operatively coupled to an end of the non-threaded portion of the adjuster rod for rotating the adjuster rod.

16. The suspension system of claim 11 further comprising:
    a hole defined in the sleeve support; and
    a setscrew disposed in the hole and contacting the damper.

17. A method for adjusting a vehicle suspension system comprising:
    providing a spring positioned around a damper and having a lower end; supporting the lower end of a spring against a housing;
    moving the lower end of the spring for adjusting vehicle ride height; said moving comprising:
        rotating an adjuster rod;
        transferring rotation of the adjuster rod to a ring gear;
        moving the ring gear linearly relative to a sleeve;
        holding the ring gear and sleeve within the housing;
        supporting the sleeve in fixed relationship relative to the damper; and
        transferring linear motion of the ring gear to the housing.

18. A system for adjusting a vehicle suspension system comprising:
    means comprising a housing for supporting a lower end of a spring positioned around a damper;
    means for moving the lower end of the spring for adjusting vehicle ride height, said means for moving comprising:
    means for rotating an adjuster rod;
    means for transferring rotation of the adjuster rod to a ring gear;
    means for moving the ring gear linearly relative to a sleeve;
    means for holding the ring gear and the sleeve within the housing;
    means for anchoring the sleeve to the damper; and
    means for transferring linear motion of the ring gear to the housing.

* * * * *